(12) United States Patent
Kockler

(10) Patent No.: US 11,612,829 B1
(45) Date of Patent: Mar. 28, 2023

(54) PROCESS FOR THE SEPARATION OF MULTICOMPONENT MIXTURES USING A PREFRACTIONATION/MAIN COLUMN ARRANGEMENT

(71) Applicant: David Norbert Kockler, Katy, TX (US)

(72) Inventor: David Norbert Kockler, Katy, TX (US)

( * ) Notice: Subject to any disclaimer, the term of this patent is extended or adjusted under 35 U.S.C. 154(b) by 0 days.

(21) Appl. No.: 17/843,985

(22) Filed: Jun. 18, 2022

(51) Int. Cl.
*B01D 3/14* (2006.01)

(52) U.S. Cl.
CPC ............. *B01D 3/143* (2013.01); *B01D 3/146* (2013.01)

(58) Field of Classification Search
CPC ................................ B01D 3/143; B01D 3/146
See application file for complete search history.

(56) References Cited

U.S. PATENT DOCUMENTS

| | | | |
|---|---|---|---|
| 3,058,893 A * | 10/1962 | Cahn | C07C 7/05 203/84 |
| 3,391,219 A | 7/1968 | Davis | |
| 3,726,938 A | 4/1973 | Berger | |
| 5,953,936 A * | 9/1999 | Agrawal | F25J 3/0295 62/643 |
| 6,286,335 B1 * | 9/2001 | Agrawal | F25J 3/04793 62/631 |
| 6,336,997 B1 * | 1/2002 | Inaba | B01D 3/146 203/84 |
| 7,476,775 B2 | 1/2009 | Kreischer | |
| 7,708,878 B2 | 5/2010 | Rosenbaum | |
| 8,840,762 B2 * | 9/2014 | Werba | C07C 7/08 203/25 |
| 8,916,740 B2 * | 12/2014 | Werba | C07C 7/00 203/25 |
| 2012/0048711 A1 * | 3/2012 | Werba | C07C 7/08 202/158 |
| 2012/0048718 A1 * | 3/2012 | Werba | C07C 7/04 203/26 |
| 2015/0152032 A1 * | 6/2015 | Aird | C07B 63/00 203/77 |

FOREIGN PATENT DOCUMENTS

| WO | 2017115305 A1 | 6/2017 |
|---|---|---|
| WO | 2020114744 A1 | 6/2020 |

OTHER PUBLICATIONS

F.B. Petlyuk, V.M. Platonov, D.M. Slavinskii, Thermodynamically optimal method for separating multicomponent mixtures, Jul. 1965, International Chemical Engineering, vol. 5, No. 3, pp. 555-561. (Year: 1965).*

Lappin, G.R., Nemec, L.H., Sauer, J.D. and Wagner, J.D. (2010). Olefins, Higher. In Kirk-Othmer Encyclopedia of Chemical Technology, (Ed.). Retrieved from https://onlinelibrary.wiley.com/.

* cited by examiner

*Primary Examiner* — Jonathan Miller

(57) ABSTRACT

This invention relates to a method of separating a multiproduct mixture using a prefractionation/main column arrangement to efficiently separate the multiproduct mixture into the desired individual products. One advantage of the invention is that it can be used to debottleneck an existing series of distillation columns, permitting a capacity expansion to take place without requiring the installation of an entire new train of distillation columns.

20 Claims, 3 Drawing Sheets

PROCESS FOR THE SEPARATION OF MULTICOMPONENT MIXTURES USING A PREFRACTIONATION/MAIN COLUMN ARRANGEMENT

BACKGROUND OF THE INVENTION

This invention relates generally to the fractional distillation of multicomponent mixtures. More specifically, the invention makes use of a prefractionation/main column arrangement to accomplish the separation of multicomponent mixtures into the desired product fractions.

Fractional distillation is a very important and widely used process used throughout the refining, chemical, and gas processing industries to separate multicomponent mixtures into two or more products. In applications in which multiple distillation products must be separated, separation may take place in a sequence of distillation steps. One common implementation of sequential distillation utilizes a series of distillation columns, each of which removes one distillation product and passes the balance of the feed to the next column in the sequence. This method may require a substantial capital investment and a large plot space in the plant to accommodate a series of distillation columns and associated equipment.

Sequential distillation processes are especially useful in chemical processes that produce a multitude of products. One such example is the production of linear alpha olefins (LAOS) by ethylene oligomerization. Ethylene oligomerization produces LAO products in increments of two carbon numbers, forming carbon chains ranging from four carbon atoms to more than 30 carbon atoms. It is desirable to recover each carbon number as a separate product, because LAO products of different carbon chain lengths are used in different applications. In some cases, however, especially with higher molecular weight LAO molecules, a range of carbon chain lengths are separated and sold as a blend of two or more carbon chain lengths. LAO molecules with a chain length ranging from C20 to C24, for example, are typically separated as a C20-C24 blend product. Common applications for LAOs includes production of polymers, plasticizers, lubricants, detergent alcohols, and oilfield chemicals.

Several different process schemes for the separation of linear alpha olefins have been published in Lappin, G. R., et. al., Kirk and Othmar Encyclopedia of Chemical Technology, Volume 17, Olefins, Higher, p. 716-721. Each of the schemes presents a sequential distillation process with at least seven distillation columns to separate the LAO products.

The large number of distillation columns required to separate numerous LAO products substantially increases the capital costs, plant operating and maintenance costs, and plot space requirements of LAO production plants. Compounding these problems is the industry practice of adding to existing plant capacity in small increments. Expanding the capacity of existing LAO production plants in small increments reduces the risk to LAO producers of oversupplying the LAO markets with excess product. The disadvantage of incremental capacity expansions is that large capital expenditures, higher plant operating and maintenance costs, and increased usage of plant plot space result from the requirement for a large number of new distillation columns.

Significant benefits would be obtained from the development of new methods that reduce the capital costs and plot space requirements for incremental LAO plant expansions. Reducing the number of distillation columns required to separate LAO products using new methods would significantly improve the economics of LAO plant expansions.

Since a large number of distillation columns are already in place in existing LAO plants, a potential opportunity exists to debottleneck the existing columns. A new method that is capable of debottlenecking existing columns could potentially reduce the number of distillation columns required in a capacity expansion to a greater extent than a scheme that requires a new parallel train of columns.

The use of dividing wall columns in lieu of conventional two product distillation columns has been proposed in WIPO patent application WO2020/114744A1 as a means to reduce the number of distillation columns and plot space required for separating LAO products. Numerous different configurations of dividing wall columns are disclosed in WO2020/114744A1, including configurations with sequential distillation using a series of three product dividing wall columns to separate LAO products. In one disclosed configuration, each dividing wall column in a sequence of dividing wall columns separates the column feed into an overhead product "A", a side draw product "B", and a bottoms product "C", where the A product comprises a first LAO product, the B product comprises a second LAO product, and the C product comprises the balance of LAOs found in the column feed.

However, dividing wall distillation is generally not well suited for the separation and removal of LAO products in a series of dividing wall columns for at least two major reasons. The first major problem is the excess enthalpy present in the column feed streams that results in vaporization of a portion of the feed as it enters the column. The partial vaporization of the feed entering each column is a consequence of progressively lower operating pressures in the sequence of distillation columns. The operating pressures of distillation columns in a sequence of columns cascade lower from column to column in order to prevent excessively high column bottoms temperatures in downstream columns. Lower operating pressures are required in downstream columns as the bottom stream composition become progressively heavier as a result of removing light LAO products as overhead distillate products in each column. Excess enthalpy in column feeds is especially detrimental in dividing wall columns and results in the increase of the required energy input to the column reboiler to compensate for excessive reflux that is required in the prefractionation zone because of the partial vaporization of the feed.

The second problem associated with using dividing wall columns to separate two LAO products from the LAO mixture that is removed in the column bottoms stream is that an unequal degree of difficulty exists between the separation between the A/B components compared with separation between the B/C components. The unequal degree of difficulty between the A/B and B/C separations arises from large differences in the molar flow rates of the A, B, and C products. The result of a large difference in the degree of difficulty between the A/B separation and the B/C separation is that a dividing wall column will require a larger reboiler energy input than two conventional two product distillation columns operating in series. Larger required reboiler energy inputs translate into larger column diameters and larger sizes for ancillary equipment associated with the column.

Perhaps the most serious drawback to using dividing wall columns in LAO plant expansions is that the existing distillation columns that perform the separation of LAO products cannot be converted to dividing wall columns because dividing wall columns generally require more separation stages and larger column diameters to perform a given separation than conventional two product distillation columns. Dividing wall columns can be implemented in the form of a parallel train of columns to perform the same function as the existing distillation columns, but they cannot debottleneck an existing train of distillation columns.

BRIEF SUMMARY OF THE INVENTION

The sequential distillation processes used in current art to recover LAO products produced by ethylene oligomerization are good examples to illustrate the benefits of the present invention. The current art for separating individual LAO products from a mixture of LAO products is depicted in Lappin, G. R., et. al., Kirk and Othmar Encyclopedia of Chemical Technology, Volume 17, Olefins, Higher, p. 716-721. Although the separation processes differ slightly from manufacturer to manufacturer, all of the separation processes utilize a feed pretreatment section followed by sequential distillation to separate individual LAO products in a series of distillation columns. A generalized sketch of such a process is shown in FIG. 1.

FIG. 1 represents a typical separation scheme for separating individual LAO products produced by ethylene oligomerization. The scheme shown in FIG. 1 does not necessarily show all separations equipment required in a LAO production plant. Other distillation columns may be required to separate unreacted ethylene feed from the reactor effluent, for example. Four distillation columns are required in the Feed Pretreatment Section: DeC4 Column 101, DeC6-C10 Column 102, DeC6 Column 103, and DeC8 Column 104. The bottoms stream 204 from the DeC6-C8 Column 102 is passed to the first column in the series of distillation columns. The following individual LAO products are recovered in the Feed Pretreatment Section: C4 product is recovered in stream 203, C6 product is recovered in stream 207, C8 product is recovered in stream 209, and C10 product is recovered in stream 208.

A LAO product stream 201 comprising C4+ molecules is provided to a feed pretreatment section for removal of C4 and C6-C10 molecules in two separate distillation columns. The purpose of the feed pretreatment section is to prepare an LAO product stream for sequential recovery of individual LAO products as overhead products in a series of distillation columns. C4 molecules are removed in a pressurized DeC4 Column 101 in stream 203. The C6+ bottoms stream 204 withdrawn from the DeC4 column has excessive enthalpy to make a suitable feed to send to the first column in a series of distillation columns because an excessive amount of flashing of the C6+ feed would take place in the receiving column. The majority of the energy used to flash an excessive percentage of the feed would be removed by the coolant in the overhead condenser without significantly reducing the reboiler duty because the moles of feed vaporized at the inlet of the column exceed the moles of overhead distillate product removed from the first column. Within the feed pretreatment section, the high enthalpy C6+ bottoms stream from the DeC4 column is passed from the DeC4 Column 101 to a DeC6-C10 Column 102 that operates under a slight vacuum. The C6+ stream removed from the bottom of the DeC4 is partially flashed as it enters DeC6-C10 Column 102, where a C6-C10 fraction is recovered as an overhead distillate product in stream 205. The molar flowrate of C6-C10 removed as an overhead distillate product represents a significant percentage of the total LAO molar flowrate of LAO product stream 201. Efficient use of the high enthalpy of the C6+ stream that is passed to DeC6-C10 Column 102 can be made by flashing a high percentage of the column feed because in this case, flashing a high percentage of the column feed as it enters the column significantly reduces the required reboiler energy input because a large volume of distillate product is produced in DeC6-C10 Column 102. The C12+ stream 204 from the bottom of the DeC6-C10 column can be regarded as a suitable feed for sequential distillation of individual LAO products. The C12+ stream 204 is passed from the feed pretreatment section to the first column in a series of distillation columns to separate individual LAO products in a series of distillation columns. In the example shown in FIG. 1, the following individual LAO products and product blends are recovered by sequential distillation in a series of distillation columns: C12 product is recovered in stream 211, C14 product is recovered in stream 213, C16 product is recovered in stream 215, C18 product is recovered in stream 217, C20-C24 product is recovered in stream 219, and C26+ product is recovered in stream 218.

In a LAO plant capacity expansion which uses the known art to remove individual LAO products through sequential distillation, it would generally be necessary to provide a new train of distillation columns to augment the nine distillation columns shown in FIG. 1. It is generally not feasible to operate distillation columns at capacities above the column design rates because the quality of distillation deteriorates when the hydraulic capacity of the columns is exceeded. When operated with vapor-liquid traffic in excess of the design rates, distillation columns experience flooding that adversely affects the quality of the distillation products. As a result, when LAO plant capacity is increased to a point that results in vapor-liquid rates in excess of the design rates of columns in an existing distillation train, it becomes necessary to provide a new parallel distillation train to process the feed that is in excess of the column design feed rates. A significant advantage would be obtained if some of the columns shown in FIG. 1 could be converted to a service with a higher throughput so that an entire new distillation train would not be required to achieve the increased production capacity requirements.

The present invention is directed to a method of converting from a process such as the scheme shown in FIG. 1 in which a series of distillation columns is used to directly fractionate a feed into individual products to a process in which a series of distillation columns is used to prefractionate a feed into product pairs which are further separated in one or more downstream distillation columns into individual products. The use of a series of distillation columns to prefractionate a feed into pairs of products produces the desired result that the series of distillation columns can process a larger throughput than a series of distillation columns that is used to directly fractionate a feed into individual products. The effect of this change in the separation process is to effectively debottleneck an existing series of distillation columns to meet the requirements of a plant expansion.

The invention provides an efficient method to separate the product pairs produced in the series of distillation columns into individual product streams. Separating the product pairs using two product columns would require a large number of columns and would also require large reboiler heat inputs. The present invention makes use of multiproduct distillation columns to efficiently separate the product pairs. A multiproduct distillation column produces an overhead product, a bottoms product, and one or more side draw products. Multiproduct columns produce three or more individual products using the same column reflux, thereby reducing the total reboiler heat input required compared with a series of two product columns.

The present invention combines the conversion of an existing sequential distillation process to a new sequential distillation process that can process higher feed rates together with an efficient method for fractionating the product pairs produced in the new sequential distillation process in order to reduce the number of new distillation columns required in a capacity expansion. In one example involving the separation of a LAO product stream into individual LAO products, process simulations showed that after converting the existing series of distillation columns from single overhead product service to prefractionation service, three of the columns were found to be capable of operating at feed rates corresponding to 168% of the original LAO product stream design rate.

By reducing the number of columns required in a capacity expansion, the present invention reduces the capital expenditure, the operating and maintenance costs for distillation columns and ancillary equipment, and the total plot space required in plant expansion projects.

Distillation processes employed to separate multiproduct mixtures often separate the multiproduct mixtures into desired product fractions and also into intermediate streams and byproduct streams. Examples of intermediate streams and byproduct streams are distillation products that require additional separation to produce final products, and unreacted feed or solvents that are recycled back to the reaction process. For the sake of clarity, the term "distillation products" is used herein to refer to streams that are separated in a distillation process, whether the separated products represent finished products, byproducts, or intermediate streams.

Sequential distillation is used to remove individual distillation products or groupings of individual distillation products in a stepwise fashion. When specific distillation products or grouping of products are removed as overhead products, the product removed in each step represents the lowest boiling product or grouping of products found in the distillation column feed. The present disclosure makes reference to specific distillation products produced in a sequential distillation by using the designation "N" to indicate the relative position of the referenced distillation product in terms of boiling range. For example, consider a series of five distillation columns with a feed that contains N and higher boiling distillation products in which each column removes a single distillation product as an overhead product until only two distillation products remain in the feed to the terminal column in the series of distillation columns. In this series of columns, the first column will remove product N as an overhead product, the second column will remove product N+1 as an overhead product, the third column will remove N+2 as an overhead product, the fourth column will remove N+3 as an overhead product, and the fifth and terminal column will remove N+4 as an overhead product. In this example, the bottoms product from the fifth column comprises N+5 distillation product.

DETAILED DESCRIPTION OF THE INVENTION

The detailed description provided herein is exemplary and provides examples of preferred embodiments of the invention. The description of the exemplary embodiments is not intended to limit the use of the invention to only the exemplary embodiments of the invention described herein.

The invention is well suited for separating any multiproduct mixture that contains three or more distillation products. It is especially well suited for application to processes in which individual distillation products are sequentially removed as overhead products in a series of distillation columns. Use of the invention is not limited to a specific range of product purities; however, the invention is particularly well suited to separating products wherein each product has similar product purity requirements. The separation of LAO product mixtures produced by ethylene oligomerization is a good example of an application that is well suited for the invention.

The invention can be used advantageously to debottleneck the throughput of one or more distillation columns in a sequential distillation in which individual products are removed from each column. The throughput of the columns in the sequential distillation is increased by changing the operation of the columns from an operation in which individual products are removed as overhead products to a prefractionation service in which product pairs are removed as overhead products. In the case in which individual products are removed from each column, a sharp cut is made between the overhead and bottoms products. In prefractionation service, the sharpness of the separation is intentionally relaxed by allowing one of the distillation products to distribute between the overhead and bottoms products. For a given feed rate, relaxing the sharpness of the separation results in reduced vapor/liquid traffic in the column, which in turn permits the column feed rate to be increased up to the point where the vapor/liquid traffic in the column reaches the hydraulic limit of the column.

Figure 1:
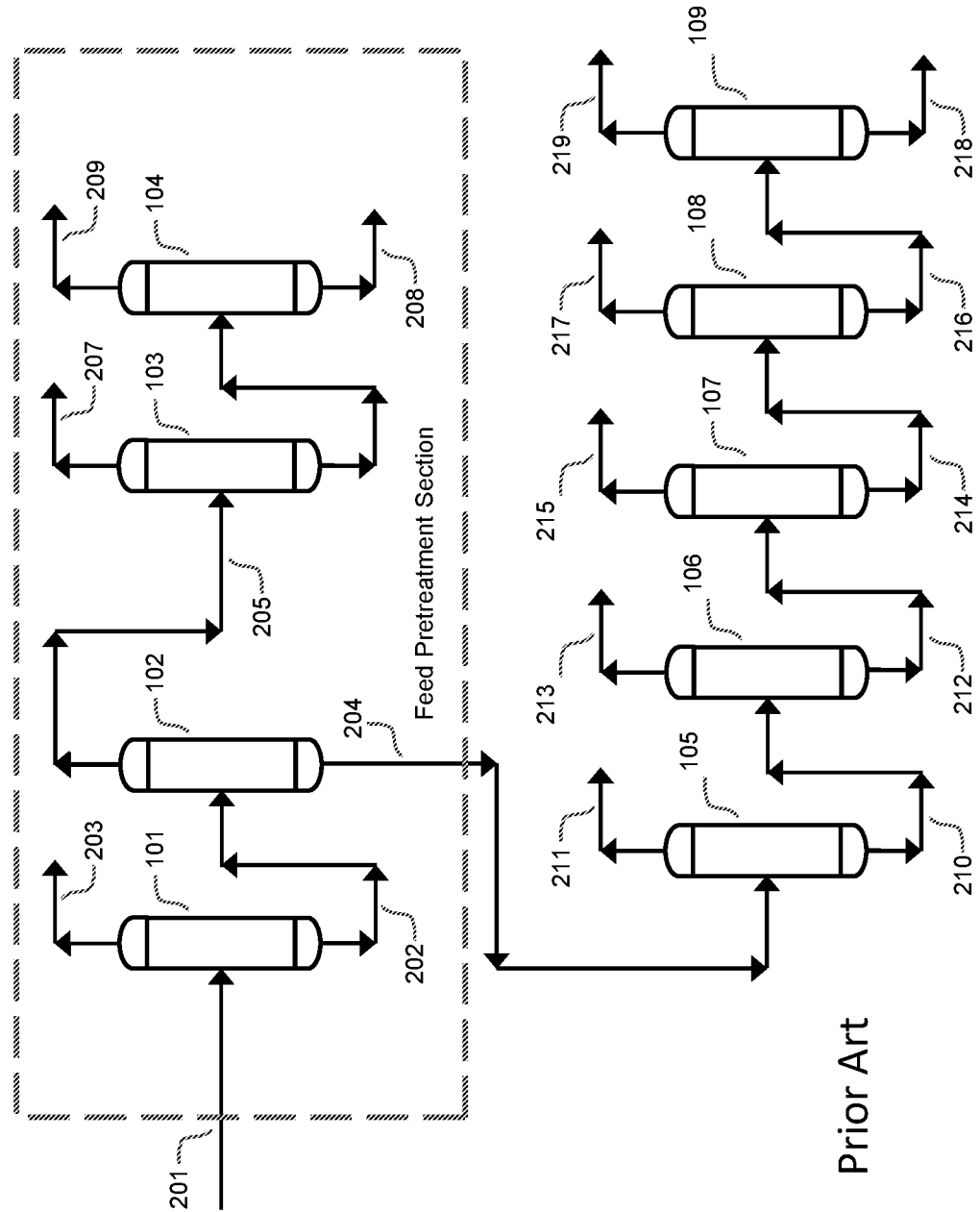
FIG. 1 provides a simplified process flow diagram of a typical sequential distillation process for separating individual LAO products using known art.
Figure 2:
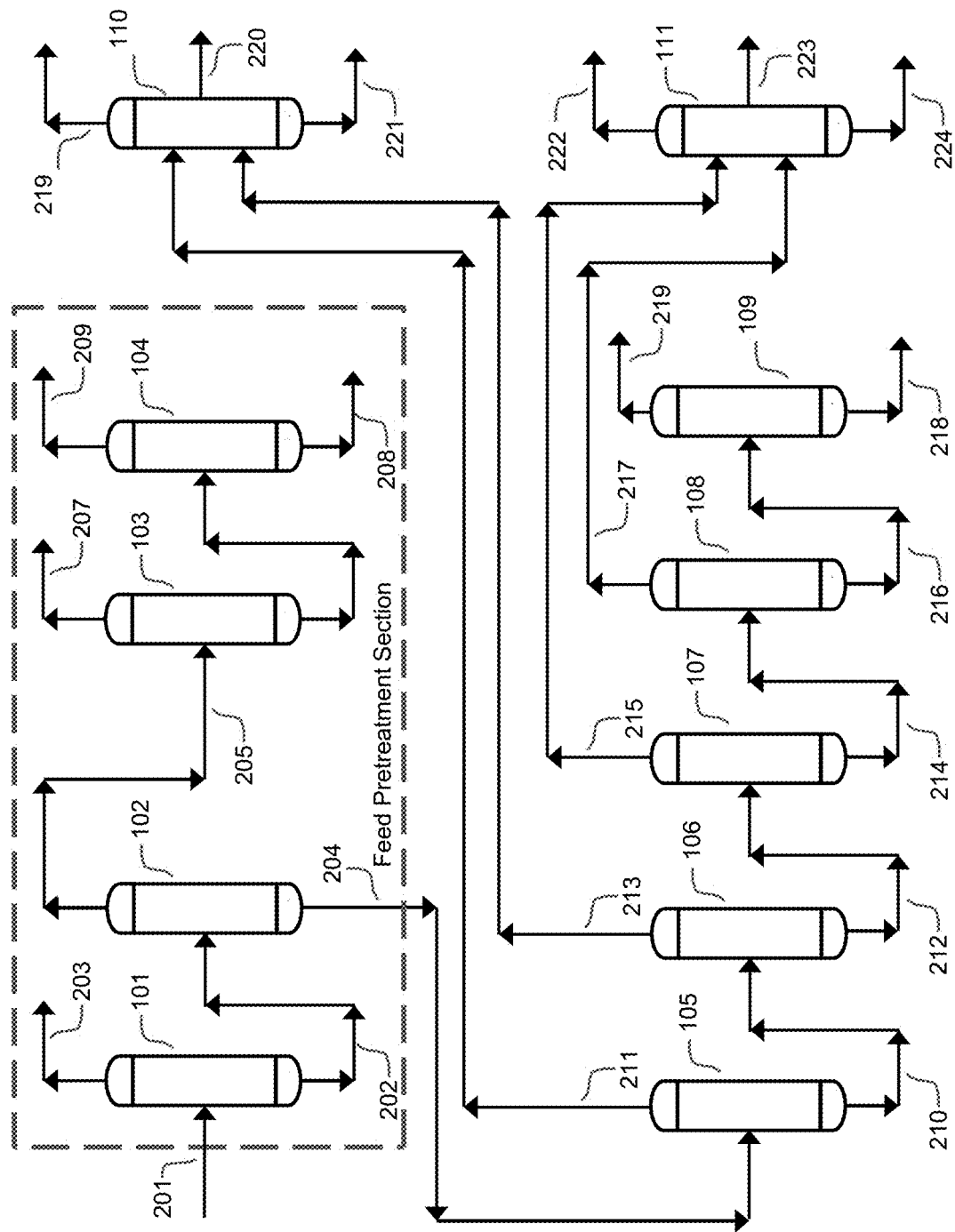
FIG. 2 provides a simplified process flow diagram of a first preferred embodiment of the invention.

A first exemplary embodiment of the invention is shown in FIG. 2. This drawing is a simplified process flow diagram of the fractionation section of an LAO plant. The simplified process flow diagram does not show details for the process system such as instrumentation and controls, valves, pumps, reboilers, condensers, and heat exchangers. Such details are known to experienced practitioners of the art.

The process depicted in FIG. 2 comprises a Feed Pretreatment Section followed by a sequential distillation process in which product pairs are removed in a series of distillation columns. An LAO product stream 201 comprising C4+ molecules is passed to a Feed Pretreatment Section for removal of C4 and C6-C10 molecules in two separate distillation columns, DeC4 Column 101 and DeC6-C10 Column 102, respectively. The purpose of the feed pretreatment section is to prepare an LAO product stream for sequential recovery of individual LAO products as overhead products in a series of distillation columns. A sharp separation is made in DeC6-C10 Column 102 between C10 molecules that are removed in overhead stream 205 and C12 molecules that are removed in bottoms stream 204. The sharp separation permits C10 product recovered in the Feed Pretreatment Section and C12 product that is recovered downstream of the Feed Pretreatment Section to meet product composition specifications. The C12+ bottoms stream 204 from the DeC6-C8 Column 102 is passed to the first column in the series of distillation columns. The following individual LAO products are recovered in the Feed Pretreatment Section: C4 product is recovered as an overhead product from DeC4 Column 101, C6 product is recovered as an overhead product from DeC6 Column 103 in stream 207, C8 product is recovered as an overhead product from DeC8 Column 104 in stream 209, and C10 product is recovered as a bottoms product from DeC8 Column 104 in stream 208.

The use of the present invention is not limited to incorporating a Feed Pretreatment System of the type depicted in the exemplary embodiment shown in FIG. 2. Any type of feed preparation that permits intermediate overhead product pairs to be efficiently produced in a series of distillation columns may be used. The term "intermediate overhead product pair" is used herein to refer to intermediate streams that are withdrawn as overhead streams from distillation columns and which require additional downstream separation to recover individual distillation products. The use of this invention is also not limited to preprocessed feeds with any particular composition. In the exemplary embodiment shown in FIG. 2, a preprocessed feed stream comprising C12+ LAOs is passed from a Feed Pretreatment Section to a series of distillation columns for sequential distillation to produce intermediate overhead product pairs. The preprocessed feed stream passed from the Feed Pretreatment System to the sequential distillation process shown in FIG. 2 can be described more generally as comprising N and higher boiling distillation products, meaning that N−1 and lower boiling distillation products are removed in the Feed Pretreatment Section. The preprocessed feed stream comprising N and higher boiling distillation products is passed from the Feed Pretreatment Section to a series of distillation columns in which each column upstream of the terminal column in the series of columns produces a product pair as an overhead product. The two distillation products included in the overhead product in the first column are distillation product N and distillation product N+1. All of the distillation product N found in the column feed to the first column is included in the product pair and a portion of distillation product N+1 found in the feed is included in the product pair produced in the first column. The portion of distillation product N+1 that is not removed in the product pair of the first column is included in the column bottoms that is fed to the second column in the sequence of columns. In the second column, all of the distillation product N+1 found in the feed to the second column is included in the intermediate overhead product pair and a portion of distillation product N+2 found in the feed is included in the product pair produced in the second column. The process of removing product pairs is repeated in the same manner throughout the series of distillation columns until the terminal column. In the terminal column, a single distillation product is removed as an overhead product and a single distillation product is removed in the column bottoms stream.

The pretreated C12+ stream 204 is passed from the DeC6-C10 Column 102 in the feed pretreatment section to the first column in a series of distillation columns, each of which removes an intermediate overhead product pair. In the first column, DeC12/C14 Column 105 produces an intermediate overhead product pair in stream 211 comprising C12 and C14 molecules. C16+ molecules are excluded in the C12/C14 overhead product to an extent that permits C14 molecules included in the C12/C14 product pair to be efficiently separated in a downstream distillation column as a C14 product that meets the specification for C16+ content. DeC12/C14 Column 105 also produces a bottoms stream 210 comprising C14+ molecules. C12− molecules are excluded in the C14+ bottoms stream 210 to permit C14 molecules included in a C14/C16 product pair produced in DeC14/C16 Column 106 to be efficiently separated in a downstream distillation column as a C14 product that meets the specification for C12− content.

When referring to a specific component or range of components found in a mixture of distillation products, the term "excluded" is used herein to mean that the referenced component or range of components is reduced to a level in the referenced mixture of distillation products that allows a final product which meets the required specification for the excluded components to be efficiently separated in a downstream distillation column. The effect of excluding certain distillation products from the overhead and bottoms product streams from each column in the series of columns that produces an intermediate overhead product pair is that a sharp separation is made between distillation product X (the lowest boiling distillation product in the feed) and distillation product X+2. Separations that produce intermediate overhead product pairs in this fashion are significantly more relaxed than separations that directly produce single overhead distillation products, which require a sharp separation to be made between distillation product X and distillation product X+1.

The intermediate overhead product pair in stream 211 produced in the DeC12/C14 Column 105 is passed to a three product C12/C14/C16 Splitter 110. The bottoms stream 210 from the DeC12/C14 Column 105 is passed to DeC14/C16 Column 106, where an intermediate overhead product pair comprising C14 and C16 molecules is produced in stream 213. C18+ molecules are excluded from the C14/C16 product pair to permit C16 molecules included in the C14/C16 product pair to be separated in a downstream distillation column as a C16 product that meets the specification for C18+ content. DeC14/C16 Column 106 also produces a bottoms stream 212 comprising C16+ molecules. C14− molecules are excluded in the C16+ bottoms stream 212 to permit C16 molecules included in the C16/C18 product pair to be separated in a downstream distillation column as a C16 product that meets the specification for C14− content. The intermediate overhead product pair in stream 213 produced in the DeC14/C16 Column 106 is also passed to the three product C12/C14/C16 Splitter 110.

A three product C12/C14/C16 Splitter 110 is used to efficiently separate the C12/C14 and C14/C16 product pairs produced in DeC12/C14 Column 105 and DeC14/C16 Column 106 into a C12 overhead product stream 219, a C14 side draw product stream 220, and a C16 bottoms product stream 221. The product pair in stream 211 produced in DeC12/C14 Column 105 enters C12/C14/C16 Splitter 110 at a feed location between the side draw removal stage and the top of the column and the product pair in stream 213 produced in DeC14/C16 Column 106 enters C12/C14/C16 Splitter 110 at a feed location between the side draw removal stage and the bottom of the column.

In the process depicted in FIG. 2, additional product pairs are removed from the third column in the sequence, DeC16/C18 Column 107, and from the fourth column in the sequence, DeC18/C20-C24 Column 108. In the third column, DeC16/18 Column 107 produces an intermediate overhead product pair in stream 215 comprising C16 and C18 molecules. C20+ molecules are excluded in the C16/C18 overhead product to permit C18 molecules included in the C16/C18 product pair to be separated in a downstream distillation column as a C18 product that meets the specification for C20+ content. DeC16/18 Column 107 also produces a bottoms stream 214 comprising C18+ molecules. C16− molecules are excluded in the C18+ bottoms stream 214 to permit C18 molecules included in the C18/C20-C24 product pair produced in DeC18/C20-C24 Column 108 to be separated in a downstream distillation column as a C18 product that meets the specification for C16− content.

The intermediate overhead product pair in stream 215 produced in DeC16/18 Column 107 is passed to a three product C16/C18/C20-C24 Splitter 111. The bottoms stream 214 from the DeC16/C18 Column 107 is passed to DeC18/C20-C24 Column 108, where an intermediate overhead product pair comprising C18 and C20-C24 molecules is produced. C26+ molecules are excluded from the C18/C20-C24 product pair to permit C20-C24 molecules included in the C18/C20-C24 product pair produced in DeC18/C20-C24 Column 108 to be separated in a downstream distillation column as a C20-C24 product that meets the specification for C26+ content. The intermediate overhead product pair in stream 217 produced in the DeC18/C20-C24 Column 108 is also passed to the three product C16/C18/C20-C24 Splitter 111. DeC18/C20-C24 Column 108 also produces a bottoms stream 216 comprising C20+ molecules. C18− molecules are excluded in the C20+ bottoms stream 216 to permit C20-C24 molecules in the feed to DeC20-C24 Column 109 to be separated as a C20-C24 product that meets the specification for C18−. Two products are produced in terminal column of the series of distillation columns. The terminal column, DeC20-C24 Column 109, produces an overhead product stream 219 comprising C20-C24 and a bottoms product stream 218 comprising C26+.

A three product C16/C18/C20-C24 Splitter 111 is used to efficiently separate the C16/C18 product pair in stream 215 and C18/C20-C24 product pair in stream 217 into a C16 overhead product stream 222, a C18 side draw product stream 223, and a C20-C24 bottoms product stream 224. The product pair in stream 215 produced in DeC16/C18 Column 107 enters C16/C18/C20-C24 Splitter 111 at a feed location between the side draw removal stage and the top of the column and the product pair in stream 217 produced in DeC18/C20-C24 Column 108 enters C16/C18/C20-C24 Splitter 111 at a feed location between the side draw removal stage and the bottom of the column.

The C16 bottoms product stream 221 removed from three product C12/C14/C16 Splitter 110 and the C16 overhead product stream 222 removed from three product C16/C18/C20-C24 Splitter 111 both meet the same product composition specifications and can be combined into a single C16 product. The C20-C24 overhead product stream 219 removed from DeC20-C24 Column 109 and the bottoms product stream 224 removed from three product C16/C18/C20-C24 Splitter 111 both meet the same product composition specifications and can be combined into a single C20-C24 product.

Figure 3:
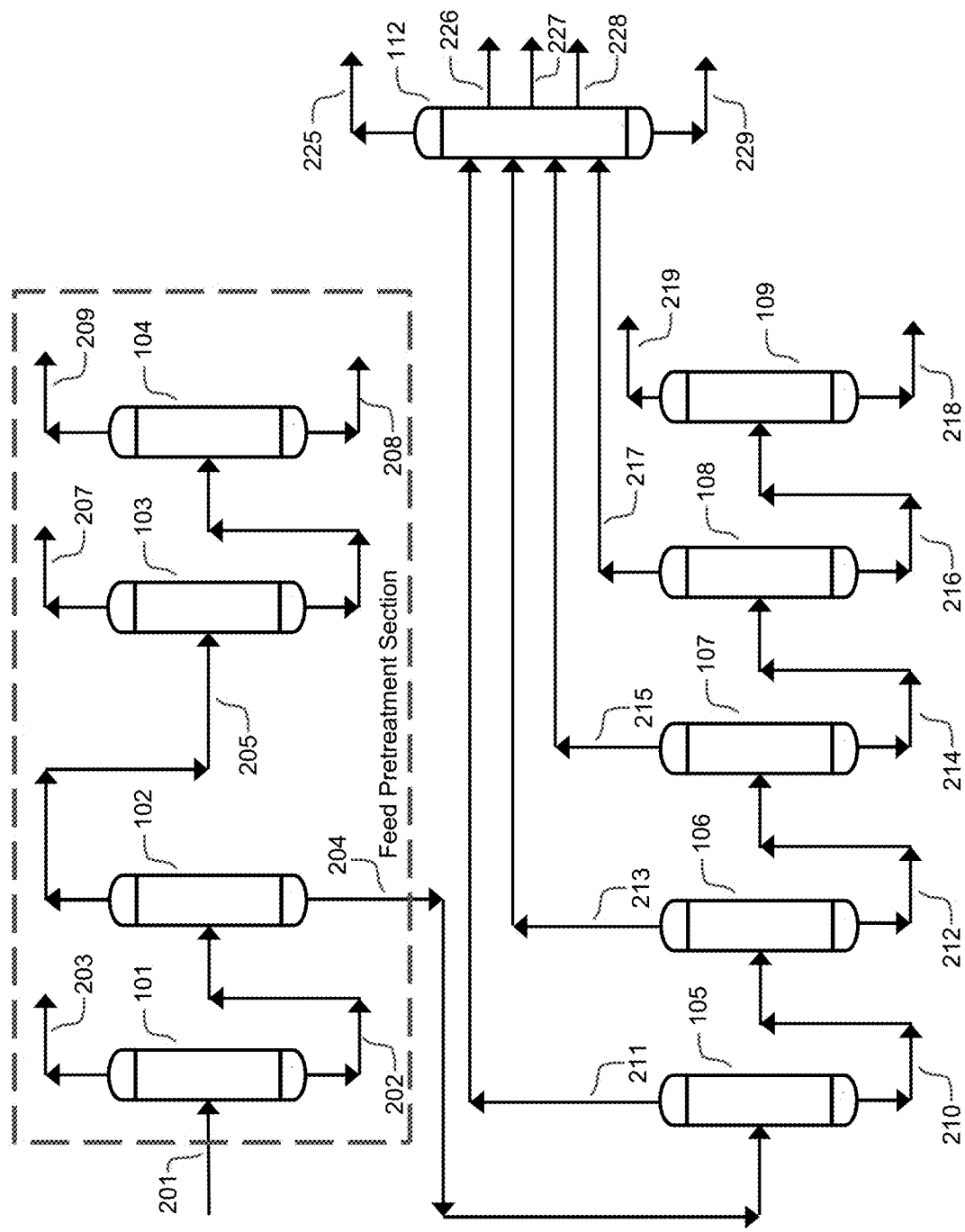
FIG. 3 provides a simplified process flow diagram of a second preferred embodiment of the invention.

A second exemplary embodiment of the invention is shown in FIG. 3. This drawing is a simplified process flow diagram of the fractionation section of an LAO plant. The simplified process flow diagram does not show details for the process system such as instrumentation and controls, valves, pumps, reboilers, condensers, and heat exchangers. Such details are known to experienced practitioners of the art.

The process depicted in FIG. 3 comprises a Feed Pretreatment Section followed by a sequential distillation process in which product pairs are removed in a series of distillation columns. A LAO product stream 201 comprising C4+ molecules is passed to a Feed Pretreatment Section for removal of C4 and C6-C10 molecules in two separate distillation columns, DeC4 Column 101 and DeC6-C10 Column 102, respectively. The purpose of the feed pretreatment section is to prepare an LAO product stream for sequential recovery of individual LAO products as overhead products in a series of distillation columns. A sharp separation is made in DeC6-C10 Column 102 between C10 molecules that are removed in overhead stream 205 and C12 molecules that are removed in bottoms stream 204. The sharp separation permits C10 product recovered in the Feed Pretreatment Section and C12 product that is recovered downstream of the Feed Pretreatment Section to meet product composition specifications. The C12+ bottoms stream 204 from the DeC6-C8 Column 102 is passed to the first column in a series of distillation columns. The following individual LAO products are recovered in the Feed Pretreatment Section: C4 product is recovered as an overhead product from DeC4 Column 101, C6 product is recovered as an overhead product from DeC6 Column 103 in stream 207, C8 product is recovered as an overhead product from DeC8 Column 104 in stream 209, and C10 product is recovered as a bottoms product from DeC8 Column 104 in stream 208.

The pretreated C12+ stream 204 is passed from the DeC6-C10 Column 102 in the feed pretreatment section to the first column in a series of distillation columns, each of which removes an intermediate overhead product pair. In the first column, DeC12/14 Column 105 produces an intermediate overhead product pair in stream 211 comprising C12 and C14 molecules. C16+ molecules are excluded in the C12/14 overhead product to an extent that permits C14 molecules included in the C12/C14 product pair to be separated in a downstream distillation column as a C14 product that meets the specification for C16+ content. DeC12/14 Column 105 also produces a bottoms stream 210 comprising C14+ molecules. C12− molecules are excluded in the C14+ bottoms stream 210 to permit C14 molecules included in a C14/C16 product pair produced in DeC14/C16 Column 106 to be separated in a downstream distillation column as a C14 product that meets the specification for C12− content.

The intermediate overhead product pair in stream 211 produced in DeC12/C14 Column 105 is passed to a five product C12/C14/C16/C18/C20-C24 Splitter 112. The bottoms stream 210 from the DeC12/C14 Column 105 is passed to DeC14/C16 Column 106, where an intermediate overhead product pair comprising C14 and C16 molecules is produced. C18+ molecules are excluded from the C14/C16 product pair to permit C16 molecules included in the C14/C16 product pair to be separated in a downstream distillation column as a C16 product that meets the specification for C18+ content. DeC14/C16 Column 106 also produces a bottoms stream 212 comprising C16+ molecules. C14− molecules are excluded in the C16+ bottoms stream 212 to permit C16 molecules included in the C16/C18 product pair to be separated in a downstream distillation column as a C16 product that meets the specification for C14− content. The intermediate overhead product pair in stream 213 produced in DeC14/C16 Column 106 is also passed to the five product C12/C14/C16/C18/C20-C24 Splitter 112.

Additional product pairs are removed from the third column in the sequence DeC16/C18 Column 107 and from the fourth column in the sequence DeC18/C20-C24 Column 108. In the third column, DeC16/18 Column 107 produces an intermediate overhead product pair in stream 215 comprising C16 and C18 molecules. C20+ molecules are excluded in the C16/18 overhead product to permit C18 molecules included in the C16/C18 product pair to be separated in a downstream distillation column as a C18 product that meets the specification for C20+ content. DeC16/18 Column 107 also produces a bottoms stream 214 comprising C18+ molecules. C16− molecules are excluded in the C18+ bottoms stream 214 to permit C18 molecules included in the C18/C20-C24 product pair produced in DeC18/C20-C24 Column 108 to be separated in a downstream distillation column as a C18 product that meets the specification for C16− content.

The intermediate overhead product pair in stream 215 produced in DeC16/18 Column 107 is passed to a five product C12/C14/C16/C18/C20-C24 Splitter 112. The bottoms stream 214 from the DeC16/C18 Column 107 is passed to DeC18/C20-C24 Column 108, where an intermediate overhead product pair comprising C18 and C20-C24 molecules is produced. C26+ molecules are excluded from the C18/C20-C24 product pair to permit C20-C24 molecules included in the C18/C20-C24 product pair produced in DeC18/C20-C24 Column 108 to be separated in a downstream distillation column as a C20-C24 product that meets the specification for C26+ content. The intermediate overhead product pair in stream 217 produced in the DeC18/C20-C24 Column 108 is also passed to the five product C12/C14/C16/C18/C20-C24 Splitter 112. DeC18/C20-C24 Column 108 also produces a bottoms stream 216 comprising C20+ molecules. C18− molecules are excluded in the C20+ bottoms stream 216 to permit C20-C24 molecules in the feed to DeC20-C24 Column 109 to be separated as a C20-C24 product that meets the specification for C18−. Two products are produced in terminal column of the series of distillation columns. The terminal column, DeC20-C24 Column 109, produces an overhead product stream 219 comprising C20-C24 and a bottoms product stream 218 comprising C26+.

A five product C12/C14/C16/C18/C20-C24 Splitter 112 is used to efficiently separate the C12/C14 product pair in stream 211 produced in DeC12/C14 Column 105, the C14/C16 product pair in stream 213 produced in DeC14/C16 Column 106, the C16/C18 product pair in stream 215 produced in DeC16/C18 Column 107, and the C18/C20-C24 product pair in stream 217 produced in DeC18/C20-C24 Column 108 into a C12 overhead product stream 225, a C14 side draw product stream 226, a C16 side draw product stream 227, a C18 side draw product stream 228, and a C20-C24 bottoms product stream 229. The product pair in stream 211 from DeC12/C14 Column 105 enters C12/C14/C16/C18/C20-C24 Splitter 112 at a feed location between C14 side draw removal stage and the top of the column; the product pair in stream 213 from DeC14/C16 Column 106 enters C12/C14/C16/C18/C20-C24 Splitter 112 at a feed location between the C16 side draw removal stage and the C14 side draw removal stage; the product pair in stream 215 from DeC16/C18 Column 107 enters C12/C14/C16/C18/C20-C24 Splitter 112 at a feed location between the C18 side draw removal stage and the C16 side draw removal stage; the product pair in stream 217 from DeC18/C20-C24 Column 108 enters C12/C14/C16/C18/C20-C24 Splitter 112 at a feed location between the C18 side draw removal stage and the bottom of the column.

The C20-C24 overhead product stream 219 removed from DeC20-C24 Column 109 and the bottoms product stream 229 removed from five product C12/C14/C16/C18/C20-C24 Splitter 112 both meet the same product composition specifications and can be combined into a single C20-C24 product.

The present invention may be used in conjunction with conventional sequential distillation in which individual distillation products are produced in two product distillation columns. In some cases, it may be advantageous to perform a sequential distillation in which one or more of the distillation columns in the sequential distillation process produces a single distillation product and at least three of the distillation columns in the sequential distillation process produce product pairs which are passed to one or more multiproduct distillation columns to separate the product pairs into individual distillation products. Consider, for example, an existing plant in which sequential distillation is used to separate multiple distillation products. In this example, the first column in an existing series of distillation columns was designed for vapor liquid traffic that exceeds the capacity of the remaining columns in the series of columns, and the plant management wishes to maximize the capacity of the distillation train up to the throughput limit of the first distillation column. In such a case, it may be advantageous to continue to utilize the first column in the series of columns to produce a single overhead product and convert the remaining columns in the series of columns to product intermediate overhead product pairs that are passed to one or more multiproduct distillation columns to separate the product pairs into individual distillation products.

The present invention can increase the throughput of a sequential distillation train that was originally designed to produce individual products directly from the sequence of columns. However, this invention is not restricted to the use of specific distillation columns in any part of the distillation process. The invention may be implemented using existing distillation columns, new distillation columns, or any combination of existing and new distillation columns in order to extract the maximum benefit from the invention.

The invention claimed is:

1. A process for separating three or more distillation products from a pre-processed product stream comprising:
   providing the pre-processed product stream comprising distillation product N and higher boiling distillation products to a first column in a series of at least three distillation columns,
   wherein an overhead stream comprising all of distillation product N and a portion of distillation product N+1 found in the feed to the first column is removed as an intermediate product pair from the first column in the series of at least three columns, and
   wherein distillation products N+2 and higher boiling distillation products are excluded from the intermediate overhead product pair from the first column, and
   wherein a first bottoms stream comprising N+1 and higher boiling distillation products is removed from the first column, and
   wherein distillation product N is excluded from the first bottoms stream and
   wherein the first bottoms stream is passed to a second column, and
   wherein an overhead stream comprising all of distillation product N+1 and a portion of distillation product N+2 found in the feed to the second column is removed as an intermediate overhead product pair from the second column in the series of at least three columns, and
   wherein distillation products N+3 and higher boiling distillation products are excluded from the intermediate overhead product pair from the second column and
   wherein a second bottoms stream comprising N+2 and higher boiling distillation products is removed from the second column, and
   wherein distillation product N+1 and lower boiling distillation products are excluded from the second bottoms stream and wherein the second bottoms stream is passed to a third column, and wherein the intermediate overhead product pairs from the first and second columns are passed to a first multiproduct distillation column or to a third multiproduct distillation column for further separation into N, N+1, and N+2 distillation products.

2. A process according to claim 1, wherein the second bottoms stream from the second column in the series of at least three distillation columns is passed to the third distillation column, wherein an overhead stream comprising all of distillation product N+2 and a portion of distillation product N+3 found in the feed to the third column is removed as an intermediate product pair from the third column in the series of at least three columns, and wherein distillation products N+4 and higher boiling distillation products are excluded from the intermediate overhead product pair from the third column, and wherein a third bottoms stream comprising N+3 and higher boiling distillation products is removed from the third column, and wherein distillation product N+2 and lower boiling distillation products are excluded from the third bottoms stream, and wherein the third bottoms stream is passed to a fourth column, and wherein an overhead stream comprising all of distillation product N+3 and a portion of distillation product N+4 found in the feed to the fourth column is removed as an intermediate overhead product pair from the fourth column in the series of at least three columns, and wherein distillation products N+5 and higher boiling distillation products are excluded from the intermediate overhead product pair from the fourth column, and wherein the intermediate overhead product pairs from the first and second columns in the series of at least three columns are passed to the first multiproduct distillation column or to the third multiproduct distillation column for further separation into N, N+1, and N+2 distillation products, and wherein the intermediate overhead product pairs from the third and fourth columns in the series of at least three columns are passed to a second multiproduct distillation column or to the third multiproduct distillation column for further separation into N+2, N+3, and N+4 distillation products.

3. A process according to claim 1, wherein the intermediate overhead product pairs from the first and second columns in the series of at least three columns are passed to the first multiproduct distillation column to produce three distillation products in the form of an overhead product, a side draw product, and a bottoms product, and wherein the intermediate overhead product pair from the first column in the series of at least three columns enters the first multiproduct distillation column at a feed stage located between the side draw removal stage and the top of the column, and wherein the intermediate overhead product pair from the second column in the series of at least three columns enters the first multiproduct column at a feed stage located between the side draw removal stage and the bottom of the column, and wherein three distillation products are removed from the first multiproduct distillation column: An overhead stream comprising product N, a side draw stream comprising product N+1, and a bottoms stream comprising a first product N+2.

4. A process according to claim 2, wherein the intermediate overhead product pairs from the first and second columns from the series of at least three columns are passed to the first multiproduct distillation column to produce three distillation products in the form of an overhead product, a side draw product, and a bottoms product, and wherein the intermediate overhead product pair from the first column in the series of at least three columns enters the first multiproduct distillation column at a feed stage located between the side draw removal stage and the top of the column, and wherein the intermediate overhead product pair from the second column in the series of at least three columns enters the first multiproduct column at a feed stage located between the side draw removal stage and the bottom of the column, and wherein three distillation products are removed from the first multiproduct distillation column: An overhead stream comprising product N, a side draw stream comprising product N+1, and a bottoms stream comprising a first product N+2, and wherein the intermediate overhead product pairs from the third and fourth columns from the series of at least three columns are passed to the second multiproduct distillation column to produce three distillation products in the form of an overhead product, a side draw product, and a bottoms product, and wherein the intermediate overhead product pair from the third column in the series of at least three columns enters the second multiproduct distillation column at a feed stage located between the side draw removal stage and the top of the column, and wherein the intermediate overhead product pair from the fourth column in the series of at least three columns enters the second multiproduct column at a feed stage located between the side draw removal stage and the bottom of the column, and wherein three distillation products are removed from the second multiproduct distillation column: An overhead stream comprising a second product N+2, a side draw stream comprising product N+3, and a bottoms stream comprising a product N+4.

5. A process according to claim 2, wherein the intermediate overhead product pairs from the first, second, third, and fourth columns in the series of at least three columns are passed to the third multiproduct distillation column to produce five distillation products in the form of an overhead product, a first side draw product, a second side draw product, a third side draw product, and a bottoms product, and wherein the intermediate overhead product pair from the first column in the series of at least three columns enters the third multiproduct distillation column at a feed stage located between the first side draw removal stage and the top of the column, and wherein the intermediate overhead product pair from the second column in the series of at least three columns enters the third multiproduct column at a feed stage located between the first side draw removal stage and second side draw removal stage, and wherein the intermediate overhead product pair from the third column in the series of at least three columns enters the third multiproduct column at a feed stage located between the second side draw removal stage and third side draw removal stage, and wherein the intermediate overhead product pair from the fourth column in the series of at least three columns enters the third multiproduct column at a feed stage located between the third side draw removal stage and the bottom of the column, and wherein five distillation products are removed from the third multiproduct distillation column: an overhead stream comprising product N, a first side draw stream comprising product N+1, a second side draw stream comprising product N+2, a third side draw stream comprising product N+3, and a bottoms stream comprising product N+4.

6. A process according to claim 1, wherein a pre-processed linear alpha olefins product stream comprising C12 and higher boiling distillation products is provided to the first column in the series of at least three distillation columns, wherein an overhead stream comprising all of the C12 and a portion of the C14 found in the feed to the first column is removed as an intermediate product pair from the first column in the series of at least three columns, and wherein C16 and higher boiling distillation products are excluded from the intermediate overhead product pair from the first column, and wherein a first bottoms stream comprising C14 and higher boiling distillation products is removed from the first column, and wherein C12 is excluded from the first bottoms stream, and wherein the first bottoms stream is passed to a second column, and wherein an overhead stream comprising all of C14 and a portion of C16 found in the feed to the second column is removed as an intermediate overhead product pair from the second column in the series of at least three columns, and wherein C18 and higher boiling distillation products are excluded from the intermediate overhead product pair from the second column, and wherein a second bottoms stream comprising C16 and higher boiling distillation products is removed from the second column, and wherein distillation product C14 and lower boiling distillation products are excluded from the second bottoms stream, and wherein the second bottoms stream is passed to a third column, and wherein the intermediate overhead product pairs from the first and second columns are passed to a first multiproduct distillation column or to a third multiproduct distillation column for further separation into C12, C14, and C16 distillation products.

7. A process according to claim 6, wherein the second bottoms stream from the second column in the series of at least three distillation columns is passed to the third distillation column, wherein an overhead stream comprising all of C16 and a portion of C18 found in the feed to the third column is removed as an intermediate product pair from the third column in the series of at least three columns, and wherein distillation products C20 and higher boiling distillation products are excluded from the intermediate overhead product pair from the third column, and wherein a third bottoms stream comprising C18 and higher boiling distillation products is removed from the third column, and wherein distillation product C16 and lower boiling distillation products are excluded from the third bottoms stream, and wherein the third bottoms stream is passed to a fourth column, and wherein an overhead stream comprising all of distillation product C18 and a portion of C20-C24 found in the feed to the fourth column is removed as an intermediate overhead product pair from the fourth column in the series of at least three columns, and wherein distillation products C26 and higher boiling distillation products are excluded from the intermediate overhead product pair from the fourth column, and wherein the intermediate overhead product pairs from the first and second columns in the series of at least three columns are passed to the first multiproduct distillation column or to the third multiproduct distillation column for further separation into C12, C14, and C16 distillation products, and wherein the intermediate overhead product pairs from the third and fourth columns in the series of at least three columns are passed to a second multiproduct distillation column or to the third multiproduct distillation column for further separation into C16, C18, and C20-24 distillation products.

8. A process according to claim 6, wherein the intermediate overhead product pairs from the first and second columns in the series of at least three columns are passed to the first multiproduct distillation column to produce three distillation products in the form of an overhead product, a side draw product, and a bottoms product, and wherein the intermediate overhead product pair from the first column in the series of at least three columns enters the first multiproduct distillation column at a feed stage located between the side draw removal stage and the top of the column, and wherein the intermediate overhead product pair from the second column in the series of at least three columns enters the first multiproduct column at a feed stage located between the side draw removal stage and the bottom of the column, and wherein three distillation products are removed from the first multiproduct distillation column: an overhead stream comprising C12 product, a side draw stream comprising C14 product, and a bottoms stream comprising a first C16 product.

9. A process according to claim 7, wherein the intermediate overhead product pairs from the first and second columns in the series of at least three columns are passed to the first multiproduct distillation column to produce three distillation products in the form of an overhead product, a side draw product, and a bottoms product, and wherein the intermediate overhead product pair from the first column in the series of at least three columns enters the first multiproduct distillation column at a feed stage located between the side draw removal stage and the top of the column, and wherein the intermediate overhead product pair from the second column in the series of at least three columns enters the first multiproduct column at a feed stage located between the side draw removal stage and the bottom of the column, and wherein three distillation products are removed from the first multiproduct distillation column: an overhead stream comprising C12 product, a side draw stream comprising C14 product, and a bottoms stream comprising a first C16 product, and wherein the intermediate overhead product pairs from the third and fourth columns from the series of at least three columns are passed to the second multiproduct distillation column to produce three distillation products in the form of an overhead product, a side draw product, and a bottoms product, and wherein the intermediate overhead product pair from the third column in the series of at least three columns enters the second multiproduct distillation column at a feed stage located between the side draw removal stage and the top of the column, and wherein the intermediate overhead product pair from the fourth column in the series of at least three columns enters the second multiproduct column at a feed stage located between the side draw removal stage and the bottom of the column, and wherein three distillation products are removed from the second multiproduct distillation column: an overhead stream comprising a second C16 product, a side draw stream comprising C18 product, and a bottoms stream comprising C20-C24 product.

10. A process according to claim 7, wherein the intermediate overhead product pairs from the first, second, third, and fourth columns in the series of at least three columns are passed to the third multiproduct distillation column to produce five distillation products in the form of an overhead product, a first side draw product, a second side draw product, a third side draw product, and a bottoms product, and wherein the intermediate overhead product pair from the first column in the series of at least three columns enters the third multiproduct distillation column at a feed stage located between the first side draw removal stage and the top of the column, and wherein the intermediate overhead product pair from the second column in the series of at least three columns enters the third multiproduct column at a feed stage located between the first side draw removal stage and second side draw removal stage, and wherein the intermediate overhead product pair from the third column in the series of at least three columns enters the third multiproduct column at a feed stage located between the second side draw removal stage and third side draw removal stage, and wherein the intermediate overhead product pair from the fourth column in the series of at least three columns enters the third multiproduct column at a feed stage located between the third side draw removal stage and the bottom of the column, and wherein five distillation products are removed from the third multiproduct distillation column: an overhead stream comprising C12 product, a first side draw stream comprising C14 product, a second side draw stream comprising product C16, a third side draw stream comprising C18 product, and a bottoms stream comprising C20-C24 product.

11. A process according to claim 1, wherein a preprocessed linear alpha olefins product stream comprising C10 and higher boiling distillation products is provided to the first column in the series of at least three distillation columns, wherein an overhead stream comprising all of the C10 and a portion of the C12 found in the feed to the first column is removed as an intermediate product pair from the first column in the series of at least three columns, and wherein C14 and higher boiling distillation products are excluded from the intermediate overhead product pair from the first column, and wherein a first bottoms stream comprising C12 and higher boiling distillation products is removed from the first column, and wherein C10 is excluded from the first bottoms stream, and wherein the first bottoms stream is passed to a second column, and wherein an overhead stream comprising all of C12 and a portion of C14 found in the feed to the second column is removed as an intermediate overhead product pair from the second column in the series of at least three columns, and wherein C16 and higher boiling distillation products are excluded from the intermediate overhead product pair from the second column, and wherein a second bottoms stream comprising C14 and higher boiling distillation products is removed from the second column, and wherein distillation product C12 and lower boiling distillation products are excluded from the second bottoms stream, and wherein the second bottoms stream is passed to a third column, and wherein the intermediate overhead product pairs from the first and second columns are passed to a first multiproduct distillation column for further separation into C10, C12, and C14 distillation products.

12. A process according to claim 11, wherein the second bottoms stream from the second column in the series of at least three distillation columns is passed to the third distillation column, wherein an overhead stream comprising all of C14 and a portion of C16 found in the feed to the third column is removed as an intermediate product pair from the third column in the series of at least three columns, and wherein distillation products C18 and higher boiling distillation products are excluded from the intermediate overhead product pair from the third column, and wherein a third bottoms stream comprising C16 and higher boiling distillation products is removed from the third column, and wherein distillation product C14 and lower boiling distillation products are excluded from the third bottoms stream, and wherein the third bottoms stream is passed to a fourth column, and wherein an overhead stream comprising all of distillation product C16 and a portion of C18 found in the feed to the fourth column is removed as an intermediate overhead product pair from the fourth column in the series of at least three columns, and wherein distillation products C20 and higher boiling distillation products are excluded from the intermediate overhead product pair from the fourth column, and wherein the intermediate overhead product pairs from the first and second columns in the series of at least three columns are passed to the first multiproduct distillation column for further separation into C10, C12, and C14 distillation products, and wherein the intermediate overhead product pairs from the third and fourth columns in the series of at least three columns are passed to a second multiproduct distillation column for further separation into C14, C16, and C18 distillation products.

13. A process according to claim 11, wherein the intermediate overhead product pairs from the first and second columns in the series of at least three columns are passed to the first multiproduct distillation column to produce three distillation products in the form of an overhead product, a side draw product, and a bottoms product, and
   wherein the intermediate overhead product pair from the first column in the series of at least three columns enters the first multiproduct distillation column at a feed stage located between the side draw removal stage and the top of the column, and
   wherein the intermediate overhead product pair from the second column in the series of at least three columns enters the first multiproduct column at a feed stage located between the side draw removal stage and the bottom of the column, and
   wherein three distillation products are removed from the first multiproduct distillation column: an overhead stream comprising C10 product, a side draw stream comprising C12 product, and a bottoms stream comprising a first C14 product.

14. A process according to claim 12, wherein the intermediate overhead product pairs from the first and second columns in the series of at least three columns are passed to the first multiproduct distillation column to produce three distillation products in the form of an overhead product, a side draw product, and a bottoms product, and
   wherein the intermediate overhead product pair from the first column in the series of at least three columns enters the first multiproduct distillation column at a feed stage located between the side draw removal stage and the top of the column, and
   wherein the intermediate overhead product pair from the second column in the series of at least three columns enters the first multiproduct column at a feed stage located between the side draw removal stage and the bottom of the column, and
   wherein three distillation products are removed from the first multiproduct distillation column: an overhead stream comprising C10 product, a side draw stream comprising C12 product, and a bottoms stream comprising a first C14 product, and
   wherein the intermediate overhead product pairs from the third and fourth columns from the series of at least three columns are passed to the second multiproduct distillation column to produce three distillation products in the form of an overhead product, a side draw product, and a bottoms product, and
   wherein the intermediate overhead product pair from the third column in the series of at least three columns enters the second multiproduct distillation column at a feed stage located between the side draw removal stage and the top of the column, and
   wherein the intermediate overhead product pair from the fourth column in the series of at least three columns enters the second multiproduct column at a feed stage located between the side draw removal stage and the bottom of the column, and
   wherein three distillation products are removed from the second multiproduct distillation column: an overhead stream comprising a second C14 product, a side draw stream comprising C16 product, and a bottoms stream comprising C18 product.

15. A process for separating three or more distillation products from a pre-processed product stream comprising:
   providing the pre-processed product stream comprising at least distillation product N and higher boiling distillation products to a first column in a first series of at least three distillation columns comprising one or more distillation columns,
   wherein an overhead product comprising a single distillation product is removed from each column in the first series of distillation columns, and
   wherein the overhead product from the last distillation column in the first series of distillation columns comprises distillation product N, and
   wherein a first bottoms product from the last column in the first series of distillation columns comprising N+1 and higher boiling distillation products is passed to a first column in a second series of distillation columns comprising three or more distillation columns and
   wherein an overhead stream comprising all of distillation product N+1 and a portion of distillation product N+2 found in the feed to the first column in the second series of distillation columns is removed as an intermediate product pair from the first column in the second series of distillation columns, and
   wherein distillation products N+3 and higher boiling distillation products are excluded from the intermediate overhead product pair from the first column in the second series of distillation columns, and
   wherein a second bottoms stream comprising N+2 and higher boiling distillation products is removed from the first column in the second series of distillation columns, and
   wherein distillation product N+1 is excluded from the second bottoms stream, and
   wherein the second bottoms stream is passed to a second column in the second series of distillation columns, and
   wherein an overhead stream comprising all of distillation product N+2 and a portion of distillation product N+3 found in the feed to the second column in the second series of distillation columns is removed as an intermediate overhead product pair from the second column in the second series of distillation columns, and
   wherein distillation products N+4 and higher boiling distillation products are excluded from the intermediate overhead product pair from the second column in the second series of distillation columns, and
   wherein a third bottoms stream comprising N+3 and higher boiling distillation products is removed from the second column in the second series of distillation columns, and
   wherein distillation product N+2 and lower boiling distillation products are excluded from the third bottoms stream, and
   wherein the third bottoms stream is passed to a third column in the second series of distillation columns, and
   wherein the intermediate overhead product pairs from the first and second columns in the second series of distillation columns are passed to a multiproduct distillation column for further separation into N+1, N+2, and N+3 distillation products.

16. A process for separating three or more distillation products from a pre-processed product stream comprising:
   providing the pre-processed product stream comprising distillation product N and higher boiling distillation products to a first column in a series of at least three distillation columns,
   wherein an overhead stream comprising all of distillation product N and a portion of distillation product N+1 found in the feed to the first column is removed as an intermediate product pair from the first column in the series of at least three columns, and wherein distillation products N+2 and higher boiling distillation products are excluded from the intermediate overhead product pair from the first column, and wherein a first bottoms stream comprising N+1 and higher boiling distillation products is removed from the first column, and wherein distillation product N is excluded from the first bottoms stream, and wherein the first bottoms stream is passed to a second column, and wherein an overhead stream comprising all of distillation product N+1 and a portion of distillation product N+2 found in the feed to the second column is removed as an intermediate overhead product pair from the second column in the series of at least three columns, and wherein distillation products N+3 and higher boiling distillation products are excluded from the intermediate overhead product pair from the second column, and wherein a second bottoms stream comprising N+2 and higher boiling distillation products is removed from the second column, and wherein distillation product N+1 and lower boiling distillation products are excluded from the second bottoms stream, and wherein the second bottoms stream is passed to a third column.

17. A process according to claim 16, wherein the intermediate overhead product pairs from the first and second columns in the series of at least three columns are passed to a multiproduct distillation column for further separation into N, N+1, and N+2 distillation products.

18. A process according to claim 16, wherein additional product pairs are removed from one or more additional groups of two consecutive columns in the series of at least three columns in the following manner:

passing the bottoms stream from the second column in the previous group of consecutive columns to the first column in the next group of two consecutive columns, and removing from the first column in the next group of two consecutive columns an intermediate overhead product pair comprising the lowest boiling distillation product and a portion of the second lowest boiling distillation product found in the feed to the first column in the next group of two consecutive columns, and passing the bottoms stream from the first column in the next group of consecutive columns to the second column in the next group of two consecutive columns, and removing from the second column in the next group of two consecutive columns an intermediate overhead product pair comprising the lowest boiling distillation product and a portion of the second lowest boiling distillation product found in the feed to the second column in the next group of two consecutive columns.

19. A process according to claim 18, wherein the intermediate overhead product pairs from the series of at least three distillation columns are passed to one or more multiproduct distillation columns for further separation into individual distillation products.

20. A process for separating three or more distillation products from a product stream comprising:

providing a product stream comprising at least three distillation products to a first column in a series of at least three distillation columns, and wherein intermediate overhead product pairs are removed from at least two consecutive columns in the series of at least three distillation columns, and wherein said intermediate overhead product pairs from said at least two consecutive columns comprise the lowest boiling distillation product and a portion of the second lowest boiling distillation product found in the feed to each column in the at least two consecutive columns and wherein the intermediate overhead product pairs produced in said at least two consecutive columns are passed to one or more multiproduct distillation columns for further separation into individual distillation products.

* * * * *